United States Patent [19]

Chabrolle

[11] 4,405,959
[45] Sep. 20, 1983

[54] MAGNETIC HEAD FOR RECORDING AND READING MAGNETIC DATA WITH VARIABLE TRACK WIDTH

[75] Inventor: Jacques Chabrolle, Bagnolet, France

[73] Assignee: L.C.C.-C.I.C.E. Compagnie Europeenne de Composants Electroniques, Bagnolet, France

[21] Appl. No.: 242,157

[22] Filed: Mar. 9, 1981

[30] Foreign Application Priority Data

Mar. 11, 1980 [FR] France .................. 80 05418

[51] Int. Cl.³ .......................... G11B 5/25; G11B 5/27; G11B 5/28
[52] U.S. Cl. .................................... 360/119; 360/121
[58] Field of Search ............... 360/119, 120, 121, 113, 360/55, 118, 122

[56] References Cited

U.S. PATENT DOCUMENTS

| | | |
|---|---|---|
| 3,060,279 | 10/1962 | Harrison . |
| 3,353,168 | 11/1967 | Poumakis . |
| 3,855,629 | 12/1974 | Koorneef ............................ 360/113 |
| 3,984,874 | 10/1976 | Mano .................................. 360/119 |
| 4,085,429 | 4/1978 | Hasegawa ........................... 360/121 |
| 4,085,430 | 4/1978 | Gerkema ............................ 360/119 |
| 4,222,084 | 9/1980 | Nakagawa .......................... 360/122 |

FOREIGN PATENT DOCUMENTS 1500593 7/1975 United Kingdom .

OTHER PUBLICATIONS

Electronics, vol. 46, No. 3, Feb. 1973, New York (US) M. Murai: "Hall-effect Magnetic Sensor Reads Data at any Speed", pp. 91-96, FIG. 11.

IBM Technical Disclosure Bulletin, vol. 18, No. 6, Nov. 1975, N. Neter et al: "Magnetic Head", pp. 1744-1745.

*Primary Examiner*—Robert M. Kilgore
*Attorney, Agent, or Firm*—Oblon, Fisher, Spivak, McClelland & Maier

[57] ABSTRACT

The invention relates to recording and reading heads used in the field of magnetic recording.

In the case where the same magnetic head serves for these two operations, the invention proposes giving to the two rectangular facing polar surfaces defining the effective air gap, different transverse dimensions, leading to a wide recorded track due to the leakage flux and a narrow read track. This difference minimizes the influence of lateral instability in movement of the mobile magnetic support medium.

11 Claims, 4 Drawing Figures

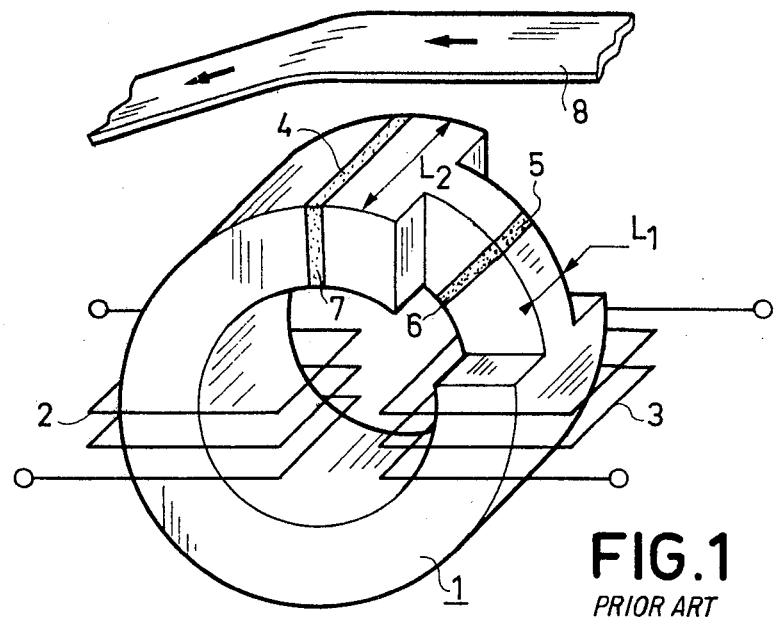
FIG. 1
PRIOR ART
FIG. 4
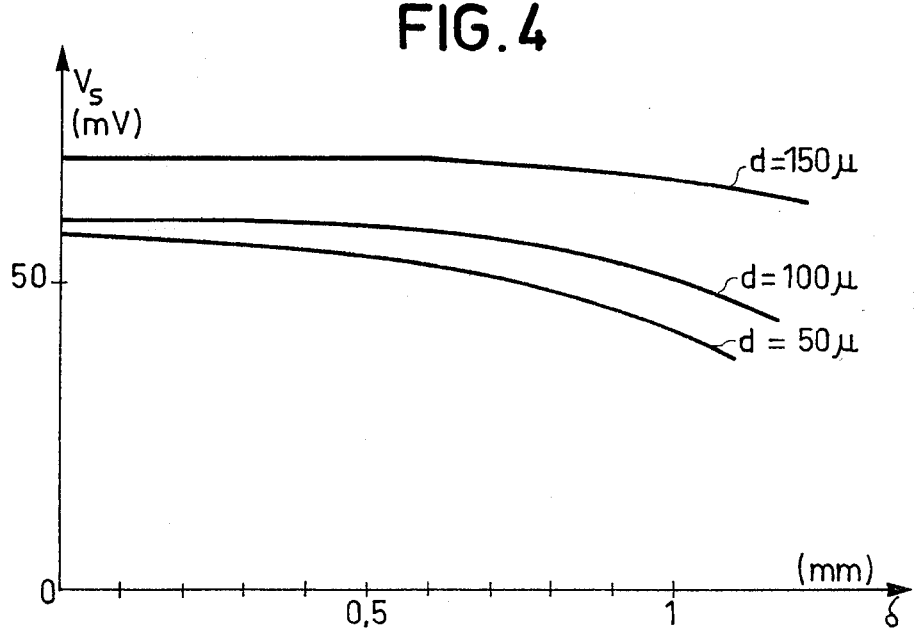

MAGNETIC HEAD FOR RECORDING AND READING MAGNETIC DATA WITH VARIABLE TRACK WIDTH

BACKGROUND OF THE INVENTION

The present invention relates to the field of magnetic recording and relates to electromagnetic transducers usually designated by the name "heads". Such transducers cooperate with a mobile magnetizable support medium in which the local variations of the magnetic condition represent the recording properly speaking and function to convert these variations into a usable electrical signal available at the terminals thereof. Symmetrically, the application of an electric signal to the terminals thereof determines a variable magnetization in the mobile magnetizable support medium which is caused to travel past these transducers.

The transfer of the reciprocal magnetism variations between such a head and a support medium is caused by this latter traveling past in front of an air gap arranged in a magnetic circuit having a generally toric shape, and the magnetic flux variations of which the magnetic circuit is the seat are either created, in the case of recording, or transformed into electric signals, in the case of reading, by means of coil-shaped windings through which passes the magnetic circuit.

In practical applications, use is often made of different heads for recording and reading, the width of the air gap and the material from which the magnetic circuit is made not being the same if it is desired to optimize the result of each operation. This is the case for example in the electro-acoustical field.

However, in other fields, such as that of magnetic data cards, for example credit cards, the space taken up by separate heads does not allow the standards defined by international regulations to be satified and it has been proposed combining the two recording and reading heads into a single case, the two air gaps forming part of magnetic circuits which are either juxtaposed or even interleaved in one another, which arrangements allow successive air gaps to be obtained very close to one another.

The use of two distinct air gaps is justified, on the one hand, by a characteristic of the magnetic recording, when it is used in the field of data cards. These latter do not lend themselves well, because of their shape, and contrary to the case of magnetic tapes, to obtaining a perfectly defined geometric tape travel. In practice, this characteristic results in fluctuations in the transverse geometric position of the support medium during travel thereof, leading to instabilities of the signal when a track magnetized by a head used for recording is caused to pass in front of the same head used for reading.

To get over these problems of mechanical tolerances of the positions of the magnetic tracks, it has been discovered that it was necessary to record a track practically three times wider than the width of the reading track, which arrangement allows a constant reading level to be obtained even if transverse fluctuations take place during the traveling of the card in front of the head.

Putting this arrangement into effect does not present special difficulties: the recording air gap is simply chosen so as to have, transversely, a length three times the length of the reading air gap.

However, as will be explained further on in detail, it has been discovered in practice that separation of the functions of the two air gaps is not completely obtained in these combined heads, although the electric recording and reading windings are separate; in fact, the two successive air gaps both record and read simultaneously, in a harmful way, the magnetic data, giving rise to risks of error, in particular in binary-type digital signals.

In practical application, it is then often necessary to give up the heads with two air gaps and to choose the simplest solution of the head with a single air gap, assuming alternately the recording and reading functions. This solution presents the disadvantage, a secondary disadvantage in the case of digital data recordings, of leading to renouncing the optimization of the performances obtained with heads having two separate air gaps; but it prohibits reading over a width narrower than that of the recorded track, a drawback the importance of which was shown earlier on.

SUMMARY OF THE INVENTION

The recording and reading head for magnetic data forming the subject matter of the present invention does not comprise this drawback.

It has only a single air gap of great transverse length and only reads a reduced width of the recorded track, by simple switching of the respective recording and reading windings.

Basically, the invention makes use of the physical fact that, in the field of magnetic recording, the recording and reading processes are not reversible.

In fact, in the recording step, when the magnetic support medium travels past in front of the air gap, its final magnetic condition depends only, all things being equal in other respects, on the field which reigns at the level of the output edge of the air gap, which field varies at the frequency of the signal to be recorded and at that of the high-frequency biasing signal characteristic of the magnetic recording. On the oher hand, in the reading step, the electric signal collected at the terminals of the windings depends on the very width of the air gap, the maximum frequency which it is possible to read before cancellation of the signal corresponding to the case where the reading air gap has a width equal to the corresponding wavelength recorded on the support medium.

The recording and reading head of the invention takes this difference into account.

It uses a single air gap, but in which the two polar surfaces of the magnetic circuit which are facing each other therein, transversely to the air gap, are of different widths.

On reading, the lines of force of the magnetic field created by the travel of the magnetic support medium remain localized in the common narrow part of the air gap whose polar surfaces are facing each other, since, as was explained above, it is the geometric width of the air gap which defines the reading process.

On the other hand, during recording, only the output edge of the air gap has a role and it is that which corresponds to the wide transverse dimension of the polar output surface.

According as to whether the magnetic head of the invention is used for recording or reading, there is thus automatic selection of the transverse width of the recorded or read track.

More precisely the invention relates a magnetic head for recording and reading magnetic data, having a variable track width, on a mobile support medium, comprising on the one hand a magnetic circuit in toroidal form and, on the other hand, electric means for the respective application and retrieval of recording and reading signals, the circuit being provided with an air gap cooperating with the mobile support medium, and defined by two polar faces, with a rectangular contour, disposed opposite each other, wherein, transversely to the plane of the torus, the respective dimensions of the two polar faces are different, the largest one determining, on the mobile support medium, the recorded width and the smallest one determining the read width.

DESCRIPTION OF THE DRAWINGS

The invention will be better understood from the following description, with reference to the accompanying drawings in which:

FIG. 1 shows a recording-reading head with two air gaps in accordance with the known art;

FIG. 4 shows rectangular axis diagrams illustrating the results obtained with a magnetic head in accordance with the invention, with respect to the principal dimensional parameters.

DESCRIPTION OF THE PREFERRED EMBODIMENTS

Figure 2:
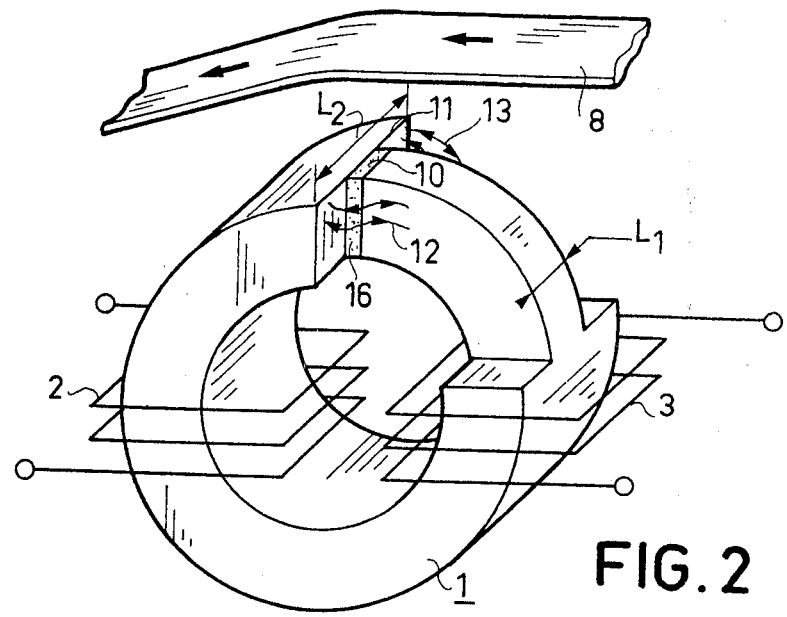
FIG. 2 shows a recording-reading head with a single air gap in accordance with the invention.

FIG. 1 shows a recording-reading head having two air gaps of the prior art.

It comprises a magnetic circuit 1 in the form of a torus and two recording 2 and reading 3 windings, through which passes the magnetic circuit. This latter is provided with two air gaps 4 and 5, respectively for recording and reading, both being filled with filling pieces 6, 7 made from a nonmagentic material such as brass. The reading air gap 5 has transversely a width ($L_1$) less than that ($L_2$) of the recording air gap 4, so that, for the reasons outlined above, during successive passes of the magnetizable support medium 8 in front of the air gaps, the width of the track actually read is less than the width of the recorded track. A magnetic head of this type presents the drawback of not ensuring separation of the functions of the air gaps, and it can be noticed, at the respective recording and reading stages, that the two air gaps record and read simultaneously, with creation of parasite signals staggered in time.

FIG. 2 shows a recording-reading head with a single air gap in accordance with the invention.

With the same parts designated by the same reference numbers, the head is characterized by the fact that the respective transverse dimensions $L_1$ and $L_2$ of the facing polar surfaces of the single air gap are different.

The operation of such a head is the following.

In the step for reading a recorded magnetic support medium, the read track width is equal to $L_1$, a reduced transverse dimension of the effective air gap, defined for the reasons given above, by the common facing surfaces, belonging to the two polar surfaces.

On the other hand, in the recording step, the magnetic state of the magnetizable support medium is defined, as was also explained above, by the field existing at the level of the output edge 11 of the air gap, corresponding to the width $L_2$ which is the large transverse dimension of the air gap. The magnetic efficiency of the lateral parts of the output edge is provided, for the largest part, by the leakage lines of force such as 12 and 13, which close laterally in the air the lines of force of the induction reigning in the magnetic circuit.

Thus, depending on whether the windings 2 and 3 are placed under recording or reading operating conditions, there is automatic selection of the transverse width $L_2$ or $L_1$ of the effective recording or reading air gap of the head.

Figure 3:
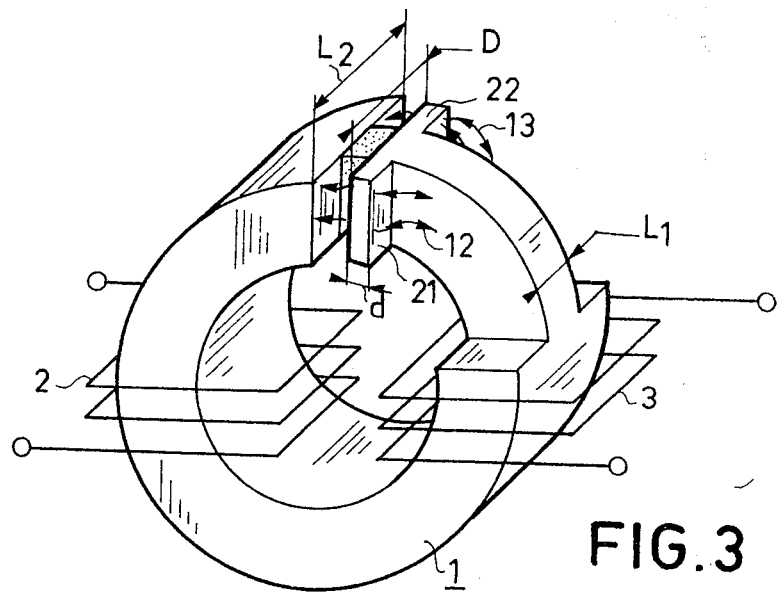
FIG. 3 shows another embodiment of the recording-reading head of FIG. 2, comprising a lateral distributor of the air gap field.

FIG. 3 shows another embodiment of the recording-reading head of FIG. 2, comprising a lateral air-gap field distributor.

According to this variation, the magnetic reluctance presented to the leakage lines of force 12, 13 in the air of the head of FIG. 2 is reduced by disposing, on each side of the polar surface corresponding to the small transverse width $L_1$, two plates 21 and 22 made from a magnetic material, forming a lateral field distributor in the air gap. This distributor increases further the effective induction which reigns in the whole of the magnetic circuit of the head, and its role thus extends as far as improving the output level of the electric signal collected at the terminals of the windings under reading operating conditions.

The choice of the optimum dimensions, in thickness d and transverse width D, of the field distributor of FIG. 3, are obtained by systematic testing.

FIG. 4 shows a diagram, in rectangular axes, summing up the experimental studies made by the Applicant, on the one hand concerning the thickness of the side-plates and, on the other hand, concerning the sensitivity to transverse shifting due to travel instabilities.

These curves show particularly that the output level under reading operating conditions $V_S$ increases when the thickness of the side-plates, forming the distributor, increases beyond values close to the width of the air gap, typically 50 micrometers for an air gap of 10 micrometers: they also show that, under these conditions, for a read track of half the width of that of the recorded track of 6.5 mm, the stability of the output level $V_S$ with respect to the transverse geometric fluctuations of position is excellent, typically ±3% for transverse shifts δ of the mobile support medium of ±0.9 mm, which shifts are greater than those that modern devices for feeding magnetic data cards are capable of ensuring.

It should be observed finally that the results supplied by the magnetic head of the invention, given above, have been given by way of order of size and that the advantages provided by the invention have been checked in particular in the case of air gaps having widths between 2 and 100 micron, with plate thicknesses between 0 and 500 micron and for speeds of the magnetic support mediums between 30 mm and 1500 mm per second.

It should also be noted that although the description has been given in the case of a head with windings, the case of a Hall-effect reading head must be included within the scope of the invention.

It should finally be noted that, although the description has been particularly centered on the case of magnetic data cards, the field of the invention extends to any other form of support medium, such as that of a floppy or rigid magnetic disk.

What is claimed is:

1. A magnetic head for recording and reading magnetic data, with variable track width, on a mobile support medium, comprising:

a magnetic circuit in ring form;

electric means for respectively applying and retrieving recording and reading signals;

an air gap provided in said magnetic circuit cooperating with the mobile support medium and delimited by two polar faces, of rectangular contour, disposed facing each other, with the respective dimensions of the two polar faces transversely to the plane of the ring being different, and with the greatest dimension determining, on the mobile support medium, the recorded width, and the smallest dimension determining the width read;

two ferromagnetic side-plates, respectively formed on each side of said polar face having the smallest dimension transversely to the plane of the ring and forming therewith a rectangular contour in order to provide a lateral field distributor in the air gap to increase the effective induction, 2. The magentic head as claimed in claim 1, wherein, transversely, the dimension of the rectangular contour formed by said smallest polar face and said side-plate is equal to that of the largest polar face.

3. The magnetic head as claimed in one of claims 1 or 2, wherein, perpendicularly to the polar faces, the side-plates have a thickness less than 500 micron.

4. The magnetic head as claimed in one of claims 1 or 2, wherein the electric means for retrieving the reading signals are formed by windings surrounding the magnetic circuit.

5. The magnetic head as claimed in on of claims 1 or 2, wherein the electric means for retrieving the reading signals are formed by a Hall-effect probe.

6. The magnetic head as claimed in one of claims 1 or 2, wherein said variable track is carried by a mobile support medium in the form of a magnetic tape.

7. The magnetic head as claimed in one of claims 1 or 2, wherein said variable track is carried by a mobile support medium formed from a rigid card generally rectangular in shape.

8. The magnetic head as claimed in one of claims 1 or 2, wherein said variable track is carried by a mobile support medium formed from a floppy or rigid magnetic disk.

9. The magnetic head as claimed in one of claims 1 or 2, wherein said smallest polar surface has a constant section.

10. The magnetic head as claimed in one of claims 1 or 2, wherein the side-plates are formed from the same magnetic material as the narrow part of the head and forming therewith a single block.

11. The magnetic head as claimed in one of claims 1 or 2, wherein the ratio between the thickness of the plates and the width of the air gap is substantially of the order of 5.

* * * * *